United States Patent [19]

Lutz et al.

[11] 4,363,515
[45] Dec. 14, 1982

[54] MOTOR VEHICLE SLIDING TOP

[75] Inventors: Alfons Lutz, Emmering; Hans Jardin, Inning, both of Fed. Rep. of Germany

[73] Assignee: Webasto-Werk W. Baier GmbH and Co., Munich, Fed. Rep. of Germany

[21] Appl. No.: 194,228

[22] Filed: Oct. 6, 1980

[30] Foreign Application Priority Data

Oct. 8, 1980 [DE] Fed. Rep. of Germany ....... 2940565

[51] Int. Cl.³ ............................................... B60J 7/10
[52] U.S. Cl. ..................................... 296/222; 296/224
[58] Field of Search ................ 296/222, 224, 223, 216

[56] References Cited

U.S. PATENT DOCUMENTS

| | | | |
|---|---|---|---|
| 3,031,226 | 4/1962 | Larche | 296/223 |
| 3,610,682 | 10/1971 | Vermeulen | 296/222 |
| 4,056,274 | 11/1977 | Jardin et al. | 296/223 |
| 4,223,942 | 9/1980 | DeLuca | 296/222 |

*Primary Examiner*—Robert R. Song
*Attorney, Agent, or Firm*—Antonelli, Terry & Wands

[57] ABSTRACT

A sliding roof panel arrangement for opening and closing an opening in the roof of a motor vehicle is provided with a crash protection construction for preventing the unintentional closing of an open sliding cover due to the influence of high inertial forces as occur from strong deceleration during a collision. In accordance with a first embodiment, a flyweight is pivotally connected to the sliding cover and is arranged so as to engage a notched bar mounted on a fixed roof portion under the influence of said high inertial forces. According to a modified embodiment, a safety belt arrangement is secured to the sliding cover at one end and is wound upon an automatic blocking roll-up mechanism secured to a fixed roof portion at its other end.

6 Claims, 7 Drawing Figures

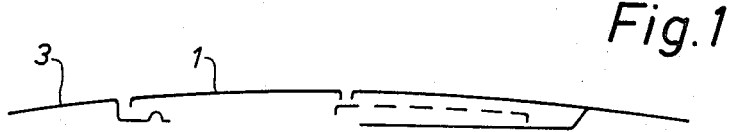
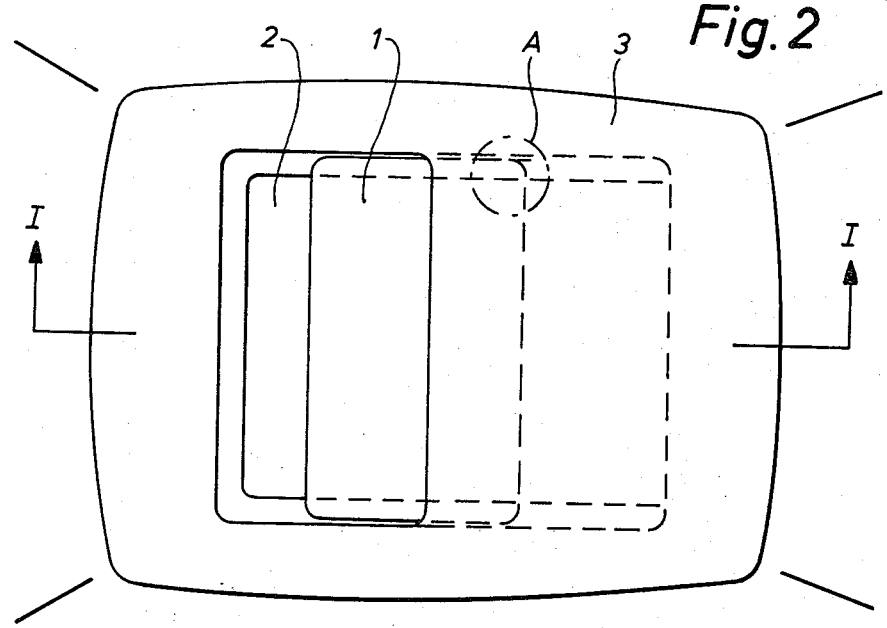
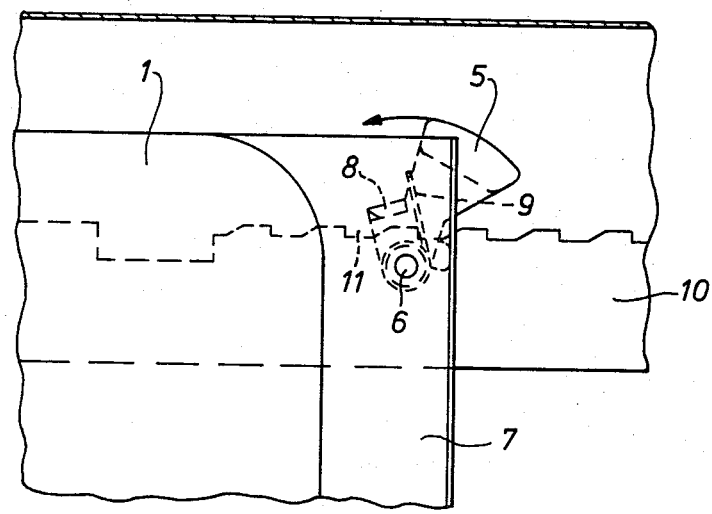

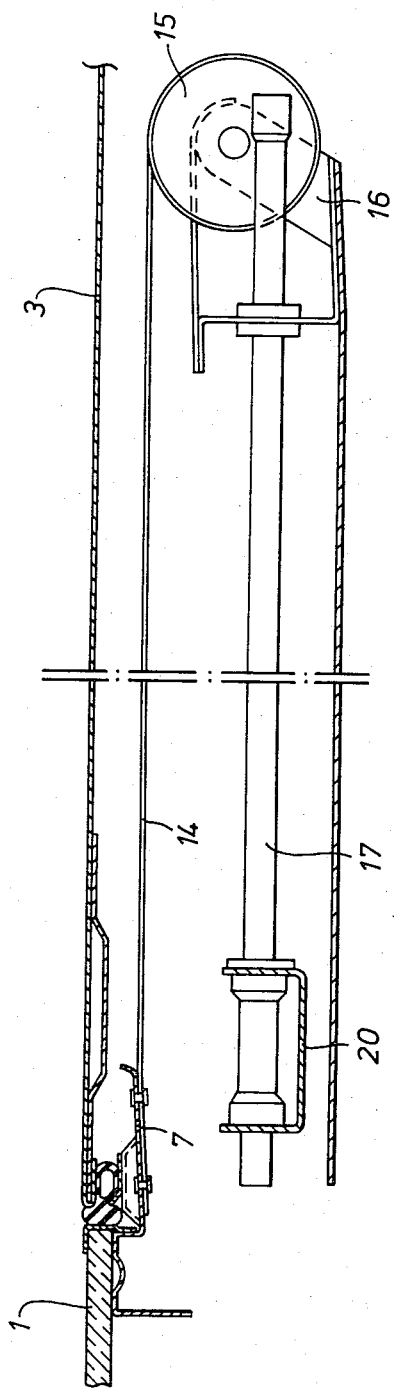

MOTOR VEHICLE SLIDING TOP

BACKGROUND AND SUMMARY OF THE INVENTION

The invention relates to a motor vehicle sliding roof comprising a rigid sliding cover which closes an opening in the roof when in a closed position, and which is lowered out of said opening and slides under a fixed rear portion of the roof.

Sliding tops of this type are known (German Pat. No. 2,309,320 and U.S. Pat. No. 4,056,274). In known sliding tops the partially or totally open sliding cover may move toward the closed position in response to sudden high deceleration forces, especially on vehicle collision. This is undesirable for safety reasons.

Thus, a principal object of the present invention is to provide a sliding roof in which the sliding cover does not move automatically in the closing direction even in a crash.

According to a preferred embodiment of the invention, this object is achieved by providing the sliding cover with crash protection means preventing the unintentional closing of an open sliding cover.

In a development of the invention the crash protection means comprises at least one flywheel pivotally connected to the sliding cover which, on collision, engages a bar provided with notches and mounted on the fixed roof portion. Such crash protection means are composed of very few elements and are easily mounted. Their operation is highly reliable.

In a modified embodiment, the crash protection means comprises at least one automatic safety belt extending between the sliding cover and the fixed roof portion.

In the case of a sliding top in which the rear edge of the sliding cover is connected to a shifting yoke by raising levers, one or more stabilizing levers can be provided additionally as crash protection means between the raising levers, perpendicularly to the vehicle longitudinal axis. Said stabilizing levers are pivoted on the shifting yoke and the rear end of the sliding cover.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a longitudinal section along line I—I in FIG. 2 through a motor vehicle sliding top;

FIG. 2 is a plan view of the sliding top of FIG. 4;

FIG. 3 is a partial section on a larger scale through the sliding top, in region A of FIG. 2;

FIG. 4 is a schematic partial longitudinal section through a modified embodiment of the sliding top;

DETAILED DESCRIPTION OF THE PREFERRED EMBODIMENTS

Figure 5:
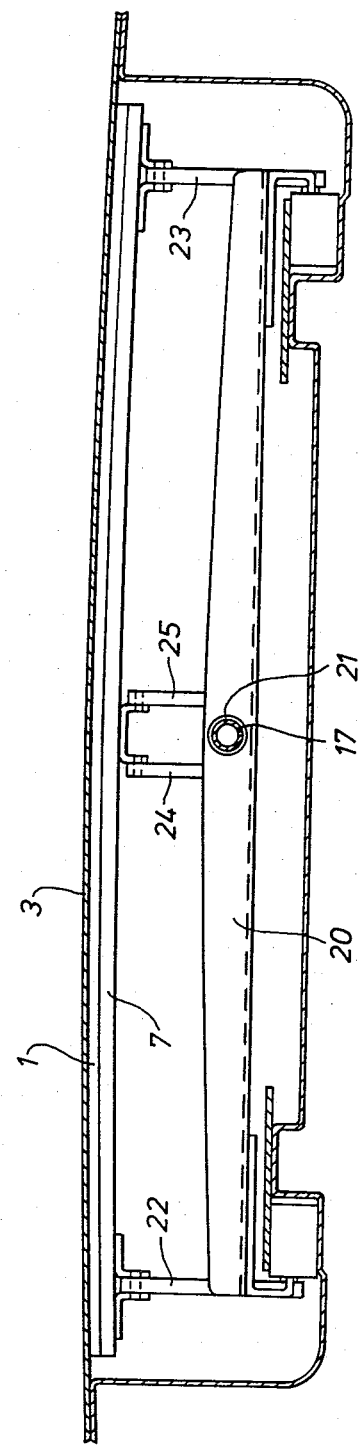
FIG. 5 is a cross-section through another modified embodiment of the sliding top.

The sliding top represented in FIGS. 1 and 2 comprises a rigid sliding cover 1. In the closed position of FIG. 1, shown by solid lines, sliding cover 1 is located in an opening 2 in a fixed top 3. Sliding cover 1 can be moved by known means (not represented) to the open position indicated by broken lines by dropping out of the top opening and sliding under the rear top portion. FIG. 2 shows sliding cover 1 in one intermediate position.

FIG. 3 represents a first embodiment of the crash protection means in the region A of the right rear edge of sliding cover 1. It is assumed that similar crash protection means may be provided at the left rear of sliding cover 1. The crash protection means is a flyweight 5 pivoted on a pin 6 relative to a rain gutter 7 fixed to sliding cover 1. Flyweight 5 is provided with a pawl 8. A spring 9 extending around pin 6 normally holds flyweight 5 in the position shown in FIG. 3, wherein pawl 8 does not engage a rack 10 mounted on the fixed top portion and extending in the longitudinal direction of the vehicle.

If strong deceleration forces are applied to the motor vehicle, (for example, on collision or rapid maximum brake application for collision avoidance) high inertial forces will cause flyweight 5 to move counterclockwise against the force of spring 9 until pawl 8 engages the adjoining notch 11 of rack 10. This arrangement excludes the uncontrolled motion of sliding cover 1 toward the closed position.

In the modified embodiment of FIG. 4, a safety belt of the type normally used for passenger restraint is instead utilized as the protection means for the cover. The free end of an automatic safety belt 14 is fixed to the rear rain gutter 7 of sliding cover 1. Support 16 if rigidly fixed to roof portion 3, and a conventionally constructed safety belt, roll-up retracter with an automatic locking mechanism is carried thereby. Numeral 17 relates to the guide tube of the drive cable of a known central drive (German Patent Application [Auslegeschrift] 2,461,018) for sliding cover 1.

When the sliding cover is dropped out of the closed position of FIG. 4 and moved under fixed rear top portion 3 (to the right in FIG. 4) safety belt 14 is wound up by roll-up mechanism 15. Safety belt 14 offers only minimum resistance to a normal speed closing motion of sliding cover 1, but roll-up mechanism 15 is blocked on collision. Sliding cover 1 is held by safety belt 14, and uncontrolled motion thereof in the closing direction is prevented.

Figure 6:
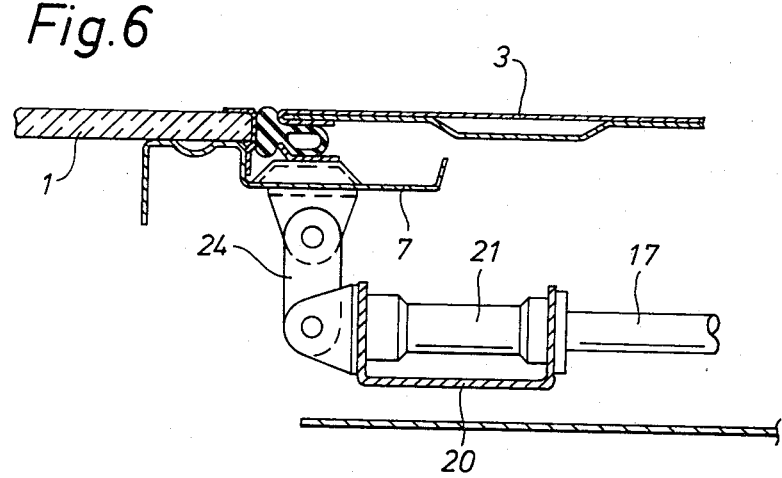
FIG. 6 is a partial longitudinal section through the rear portion of the sliding cover of the sliding top of FIG. 5.
Figure 7:
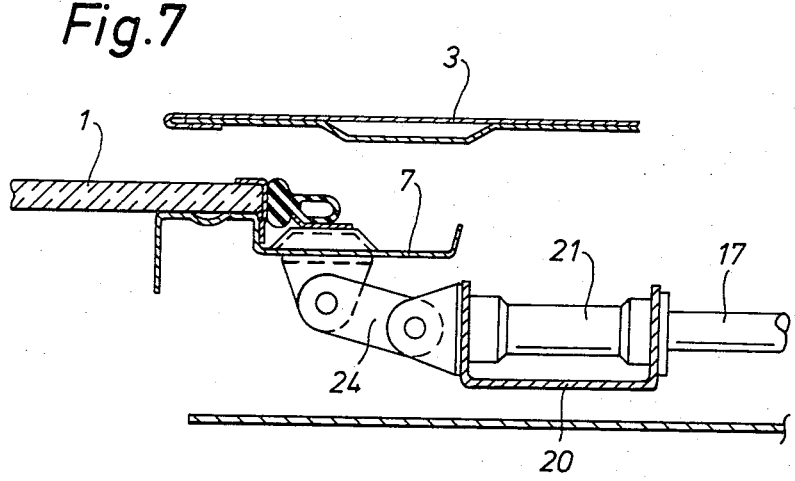
FIG. 7 is a section as in FIG. 6, but with the sliding cover shown in a partially opened position.

FIGS. 5, 6, and 7 show parts of a drive for sliding cover 1. A similar drive can be provided also in the embodiments of FIGS. 3 and 4. The guide tube 17 of the compression resistant drive cable (not shown) is conventionally mounted (U.S. Pat. No. 4,056,274) on fixed top portion 3 and passed over a tubular member 21 fixed to a transport bridge or shifting yoke 20. The drive cable is attached inside bridge 20 which is connected on both sides to the rear edge of sliding cover 1 by raising levers 22 and 23 (FIG. 5). In addition to erecting levers 22 and 23, two stabilizing levers 24 and 25 are provided near the longitudinal median plane of sliding cover 1. One end of stabilizing levers 24 and 25 is pivoted on bridge 20, and the other ends of said levers are pivoted on rear rain gutter 7. In FIGS. 6 and 7 stabilizing levers 24 and 25 move together with erecting levers 22 and 23 when sliding cover 1 is lowered from or returned to the closed position. They reinforce bridge 20 to prevent the bending thereof in response to inertial forces on collision. Since bending of bridge 20 will adversely effect operation of FIGS. 3 and 4 embodiments, this arrangement further serves to prevent unintentional sliding motion of the cover 1 in the closing direction.

Although embodiments of crash protection means for a simple sliding top are described in reference to FIGS. 3–7, it is understood that similar protection means can be provided in the case of a lifting sliding top, i.e. a sliding top in which the rear edge of the sliding cover optionally can be moved upward and out of the top opening.

While we have shown and described several embodiments in accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

We claim:

1. A motor vehicle sliding roof comprising a rigid sliding cover for closing an opening in the roof in a closed position, and mounted for dropping out of said opening and sliding under a fixed rear portion of the roof, said sliding cover being provided with protection means for preventing the unintentional shifting of the cover toward said closed position under the effect of high inertial forces, such as occur in a crash, wherein a rear edge of the sliding cover is connected to a shifting yoke by erecting levers, said protection means comprising the erecting levers and one or more stabilizing levers mounted between the erecting levers in the vicinity of the vehicle longitudinal median plane, and pivoted at one end on the rear portion of the sliding cover and an opposite end on said shifting yoke, whereby unintentional sliding motion of the sliding cover related to bending of said shifting yoke is prevented.

2. A motor vehicle sliding roof comprising a rigid sliding cover for closing an opening in the roof in a closed position, and mounted for dropping out of said opening and sliding under a fixed rear portion of the roof, said sliding cover being provided with protection means for preventing the unintentional shifting of the cover toward said closed position under the effect of high inertial forces, such as occur in a crash, wherein the protection means comprises at least one flyweight pivoted on the sliding cover and engaging on collision a bar provided with notches and mounted on said fixed roof portion.

3. A sliding roof according to claim 2, wherein said flyweight is biased by a spring to a position out of engagement with said notches, said spring and flyweight being selected so as to enable said flyweight to overcome the biasing of said spring and engage said notches due to the effect of said high inertial forces.

4. A motor vehicle sliding roof comprising a rigid sliding cover for closing an opening in the roof in a closed position, and mounted for dropping out of said opening and sliding under a fixed rear portion of the roof, said sliding cover being provided with protection means for preventing the unintentional shifting of the cover toward said closed position under the effect of high inertial forces, such as occur in a crash, wherein the protection means comprises at least one automatic safety belt arrangement extending between the sliding cover and the fixed roof portion.

5. A sliding roof according to claim 4, wherein said safety belt arrangement comprises a safety belt roll-up retractor with an automatic locking mechanism carried by said fixed roof, and a safety belt windably connected to said retractor at one end and secured to said sliding cover at an opposite end, said safety belt winding and unwinding with normal opening and closing movements of said sliding cover, but obstructing closing movement of said sliding cover upon actuation of said automatic locking mechanism.

6. A sliding roof as in claim 2 or 4, wherein a rear edge of the sliding cover is connected to a shifting yoke by erecting levers, said crash protection means comprising the erecting levers, one or more stabilizing levers mounted between the erecting levers, and pivoted on the rear portion of the sliding cover.

* * * * *